United States Patent
Dash et al.

(10) Patent No.: US 12,242,796 B2
(45) Date of Patent: Mar. 4, 2025

(54) PERMUTATION INVARIANCE FOR REPRESENTING LINEARIZED TABULAR DATA

(71) Applicant: INTERNATIONAL BUSINESS MACHINES CORPORATION, Armonk, NY (US)

(72) Inventors: Sarthak Dash, Jersey City, NY (US); Sugato Bagchi, White Plains, NY (US); Nandana Mihindukulasooriya, Cambridge, MA (US); Alfio Massimiliano Gliozzo, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 490 days.

(21) Appl. No.: 17/807,461

(22) Filed: Jun. 17, 2022

(65) Prior Publication Data
US 2023/0409806 A1    Dec. 21, 2023

(51) Int. Cl.
| | |
|---|---|
| *G06F 16/00* | (2019.01) |
| *G06F 40/157* | (2020.01) |
| *G06F 40/284* | (2020.01) |

(52) U.S. Cl.
CPC .......... *G06F 40/157* (2020.01); *G06F 40/284* (2020.01)

(58) Field of Classification Search
CPC ........ G06F 18/29; G06F 18/22; G06F 18/217; G06F 30/27; G06F 30/15; G06F 40/157;
(Continued)

(56) References Cited

U.S. PATENT DOCUMENTS

| | | |
|---|---|---|
| 8,099,382 B2 | 1/2012 | Liu et al. |
| 8,214,378 B2 | 7/2012 | Kohlhammer et al. |

(Continued)

FOREIGN PATENT DOCUMENTS

| | | |
|---|---|---|
| KR | 10-0842263 B1 | 6/2008 |
| KR | 10-2022-0004574 A | 1/2022 |
| KR | 10-2385983 B1 | 4/2022 |

OTHER PUBLICATIONS

Cohen-Karlik, et al., "Regularizing Towards Permutation Invariance in Recurrent Models", 34th Conference on Neural Information Processing Systems, NeurIPS, 2020, 11 pages.

(Continued)

*Primary Examiner* — Yicun Wu
(74) *Attorney, Agent, or Firm* — Robert R. Aragona

(57) ABSTRACT

An embodiment for encoding permutation-invariant representations of linearized tabular data. The embodiment may receive input including tabular data and linearize a column or row within the received tabular data. The embodiment may automatically assign an increasing sequence of position identifiers to each non-delimiting tokenized cell in the linearized column or row until a header delimiter is reached. The embodiment may, in response to reaching the header delimiter, automatically assign a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters. The embodiment may automatically assign a static position identifier for each of the cell delimiters in the linearized column or row and output an encoded permutation-invariant representation of the linearized column or row.

20 Claims, 7 Drawing Sheets

(58) Field of Classification Search
CPC ....... G06F 40/18; G06F 40/284; G06N 3/042; G06N 3/04; G06N 3/082; G06N 5/02; G06N 3/006
See application file for complete search history.

(56) References Cited

U.S. PATENT DOCUMENTS

| | | | |
|---|---|---|---|
| 11,080,607 | B1 | 8/2021 | Demtchenko |
| 11,188,585 | B2 | 11/2021 | Yanosy et al. |
| 11,256,995 | B1 | 2/2022 | Bucher |
| 11,263,534 | B1 | 3/2022 | Prat |
| 2017/0230171 | A1* | 8/2017 | Gadepally ............... H04L 9/14 |
| 2021/0090692 | A1 | 3/2021 | Schmeink et al. |
| 2021/0286942 | A1 | 9/2021 | Benson |
| 2022/0051126 | A1 | 2/2022 | Quader et al. |
| 2023/0316147 | A1 | 10/2023 | Dias et al. |
| 2023/0418848 | A1 | 12/2023 | Clinchant et al. |

OTHER PUBLICATIONS

Deng, et al. "TURL: Table Understanding through Representation Learning." Proceedings of the VLDB Endowment, 2021, vol. 14, No. 3, pp. 307-319. https://doi.org/10.14778/3430915.3430921.

Disclosed Anonymously, "Spatial-Temporal Skeleton Transformers for Action Recognition", IP.com, IPCOM000266923D, Sep. 1, 2021, 8 Pages. https://ip.com/IPCOM/000266923.

Habibi, et al., "DeepTable: a permutation invariant neural network for table orientation classification", Springer, Data Mining and Knowledge Discovery, Sep. 8, 2020, 21 Pages. https://link.springer.com/article/10.1007/s10618-020-00711-x.

Hulsebos, et al., "Sherlock: A deep learning approach to semantic data type detection", Proceedings of the 25th ACM SIGKDD International Conference on Knowledge Discovery & Data Mining. Aug. 4-8, 2019, 9 Pages. https://https://dl.acm.org/doi/10.1145/3292500.3330993.

Disclosed Anonymously, "Explainability of Automatically Trained ML Models", IP.com IPCOM000268322D; Jan. 24, 2022, 4 Pages. https://ip.com/IPCOM/000268322.

Disclosed Anonymously, "Optimize Agile Project Execution Plans by Mining User Story Interdependencies via Machine Learning Techniques", IP.com, IPCOM000268697D, Feb. 16, 2022, 10 Pages. https://ip.com/IPCOM/000268697.

Jimenez-Ruiz, et al., "Results of SemTab 2020", CEUR Workshop Proceedings, 2775, 2020, 9 Pages. https://openaccess.city.ac.uk/id/eprint/25441/1/.

Kalra, et al., "Learning Permutation Invariant Representations Using Memory Networks", ArXiv, Jul. 3, 2020, 17 pages. arXiv:1911.07984v2[cs.LG].

Lee, et al., "Set Transformer: A Framework for Attention-based Permutation-Invariant Neural Networks", Proceedings of the 36th International Conference on Machine Learning, PMLR 97, 2019, 10 Pages. http://proceedings.mlr.press/v97/lee19d/lee19d.pdf.

Mell et al., "The NIST Definition of Cloud Computing", Recommendations of the National Institute of Standards and Technology, NIST Special Publication 800-145, Sep. 2011, 7 pages.

Pang, et al., "SetRank: Learning a Permutation-Invariant Ranking Model for Information Retrieval," arXiv:1912.05891v1 [cs.IR], Dec. 12, 2019, Proceedings of ACM Conference (Conference '17), Jul. 2017, ACM, 11 pgs., https://arxiv.org/pdf/1912.05891v1.pdf.

Santoro, et al., "A simple neural network module for relational reasoning", 31st Conference on Neural Information Processing Systems, NIPS, 2017, 10 pages. https://proceedings.neurips.cc/paper/2017/file/e6acf4b0f69f6f6e60e9a815938aa1ff-Paper.pdf.

Vinyals, et al., "Order Matters: Sequence to Sequence for Sets", ICLR, Feb. 23, 2016, 11 pages. arXiv:1511.06391v4[stat.ML].

Yang, et al. "Robust attentional aggregation of deep feature sets for multi-view 3D reconstruction." International Journal of Computer Vision 128.1 (2020), pp. 53-73. https://link.springer.com/content/pdf/10.1007/s11263-019-01217-w.pdf.

Zaheer, et al., "Deep Sets", 31st Conference on Neural Information Processing System, NIPS, 2017, 11 pages. https://papers.nips.cc/paper/2017/file/f22e4747da1aa27e363d86d40ff442fe-Paper.pdf.

Zhang, et al., "Web table extraction, retrieval, and augmentation: A survey," ACM Transactions on Intelligent Systems and Technology, Feb. 2020, ResearchGate, 36 pgs.

Chen, et al.. "Learning Semantic Annotations for Tabular Data", Proceedings of the Twenty-Eighth International Joint Conference on Artificial Intelligence, IJCAI, 2019 , pp. 2088-2094. https://www.ijcai.org/Proceedings/2019/0289.pdf.

Abdelmageed, et al., "JenTab Meets SemTab 2021's New Challenges", SemTab@ISWC 2021, https://paperswithcode.com/paper/jentab-meets-semtab-2021-s-new-challenges, Accessed on May 18, 2023, 15 Pages.

Cutrona, et al., "Tough Tables: Carefully Evaluating Entity Linking for Tabular Data", Springer International Publishing, The Semantic Web—ISWC 2020, Lecture Notes in Computer Science, 18 pages.

Dash, et al., "Permutation Invariant Strategy Using Transformer Encoders for Table Understanding", Findings of the Association for Computational Linguistics, NAACL 2022, 14 Pages.

Hendrycks, et al., "Gaussian Error Linear Units (GELUs)", arXiv:1606.08415v4 [cs.LG], Jul. 8, 2020, 9 Pages.

Hu, et al., "VizNet: Towards A Large-Scale Visualization Learning and Benchmarking Repository", CHI 2019, May 4-9, 2019, ACM, pp. 1-12.

IBM: List of IBM Patents or Patent Applications Treated as Related (Appendix P), Jun. 1, 2023, 2 pages.

Iida, et al., "Tabbie: Pretrained Representations of Tabular Data", Proceedings of the 2021 Conference of the North American Chapter of the Association for Computational Linguistics: Human Language Technologies, Jun. 6-11, 2021, pp. 3446-3456.

Jimenez-Ruiz, "SemTab 2019: Resources to Benchmark Tabular Data to Knowledge Graph Matching Systems", ResearchGate, Conference Extended Semantic Web Conference (ESWC), Jun. 2020, 17 Pages. https://www.researchgate.net/publication/339851253_SemTab_2019_Resources_to_Benchmark_Tabular_Data_to_Knowledge_Graph_Matching_Systems.

Johnson, et al., "Billion-scale similarity search with GPUs", arXiv:1702.08734v1 [cs.CV], Feb. 28, 2017, 12 Pages.

Khattab, et al., "ColBERT: Efficient and Effective Passage Search via Contextualized Late Interaction over BERT", arXiv:2004.12832v2 [cs.IR] Jun. 4, 2020, 10 Pages.

McCray, "An upper-level ontology for the biomedical domain", Comparative and Functional Genomics, Comp Funct Genom 2003; pp. 80-84.

Mulwad, et al., "Using linked data to interpret tables", ResearchGate, Nov. 2010, 13 Pages. https://www.researchgate.net/publication/228806432_Using_linked_data_to_interpret_tables.

Ritze, et al., "Matching HTML Tables to DBpedia", Wims, 2015, ACM, 6 Pages.

Suhara, et al., "Annotating Columns with Pre-trained Language Models", arXiv:2104.01785v2 [cs.DB], Mar. 1, 2022, 15 pages.

Zhang, et al., "Sato: Contextual Semantic Type Detection in Tables", Proceedings of the VLDB Endowment, vol. 13, No. 11, 2020, pp. 1835-1848.

Zhu et al., Permutation-Invariant Tabular Data Synthesis. 2022 IEEE International Conference on Big Data (Big Data), Osaka, Japan, 2022 pp. 5855-5864. [retrieved online Jun. 5, 2024], Retrieved from the Internet: doi: 10.1109/BigData55660.2022.10020639 (Year: 2022).

* cited by examiner

| [CLS] | city | : | mad | ##rid | \| | seoul | \| | dam | ##as | ##cus | \| | singapore | \| | kings | ##town | [SEP] |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 |
| 0 | 1 | 2 | 3 | 4 | 6 | 3 | 6 | 3 | 4 | 5 | 6 | 3 | 6 | 3 | 4 | 7 |

| Approach | All Input Data | Entity Mentions Only | Without Metadata |
|---|---|---|---|
| TURL (TinyBERT) | 0.805 | 0.628 | 0.775 |
| TinyBERT Only | 0.812 | 0.706 | 0.803 |
| TinyBERT + PI | 0.832 | 0.716 | 0.813 |

320

| Approach | T2D-Te |
|---|---|
| HNN + P2Vec [1] | 0.966 |
| TURL + Table Metadata | 0.962 |
| TinyBERT + PI | 0.985 |

330

| Metric | TinyBERT + PI | TinyBERT | BERT Base with PI | BERT Base |
|---|---|---|---|---|
| MRR | 0.604 | 0.466 | 0.674 | 0.591 |
| Hits at 1 | 0.402 | 0.237 | 0.487 | 0.387 |
| Hits at 3 | 0.774 | 0.639 | 0.847 | 0.794 |
| Hits at 5 | 0.866 | 0.764 | 0.907 | 0.888 |
| Hits at 10 | 0.922 | 0.898 | 0.958 | 0.943 |

Figure 3

PERMUTATION INVARIANCE FOR REPRESENTING LINEARIZED TABULAR DATA

BACKGROUND

The present application relates generally to data processing, and more particularly, to encoding permutation-invariant representations of linearized tabular data.

Many businesses store data including valuable information in tabular structures containing natural language text such as spreadsheets, CSV files, and relational databases. Various analytics and functions are used to process this text, such as search functions, question answering systems over table content, table interpretation functions to analyze structural and semantic understanding of the contents of a given table, and more. Recent advances have popularized the use of transformer-based language models pre-trained on sentence-based natural language models to facilitate functions associated with table analytics. However, tabular data is order independent. A representation strategy for encoding tabular data that maintains the property of permutation invariance would be desirable for facilitating various functions associated with table analytics.

SUMMARY

According to one embodiment, a method, computer system, and computer program product for encoding tabular data with premutation invariance is provided. The embodiment may include receiving input including tabular data and linearizing a column or row within the received tabular data. The embodiment may also include automatically assigning an increasing sequence of position identifiers to each non-delimiting tokenized cell in the linearized column or row until a header delimiter is reached. The embodiment may also in response to reaching the header delimiter, automatically assigning a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters. The embodiment may further include automatically assigning a static position identifier for each of the cell delimiters in the linearized column or row, the static position identifier being 1 greater than a highest position identifier assigned to the non-delimiting tokenized cells. The embodiment may also include automatically outputting an encoded permutation-invariant representation of the linearized column or row.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2B illustrates an exemplary tabular dataset that has been linearized and assigned position identifiers using a convention encoding strategy and an encoding strategy in accordance with at least one embodiment;

FIG. 3 depicts multiple tables illustrating column type annotation tasks performance of an exemplary system that utilizes encoded tabular data with permutation invariance according to at least one embodiment;

DETAILED DESCRIPTION

Figure 1:
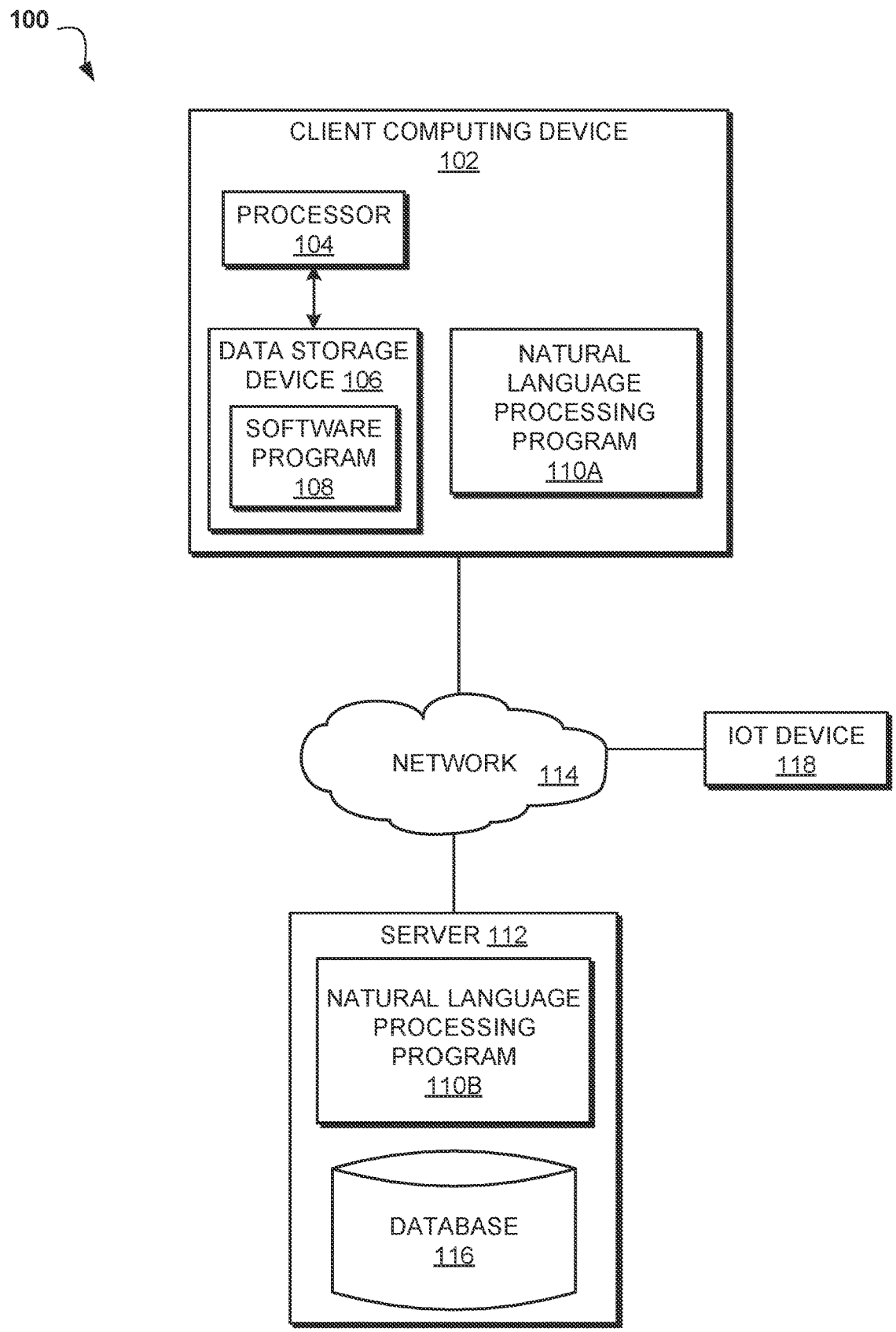
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to data processing, and more particularly, to encoding tabular data with permutation invariance. The following described exemplary embodiments provide a system, method, and program product to, among other things, receive input including tabular data and linearize a column or row within the received tabular data, automatically assign an increasing sequence of position identifiers to each non-delimiting tokenized cell in the linearized column or row until a header delimiter is reached, and then in response to reaching the header delimiter, automatically assign a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters, and automatically assign a static position identifier for each of the cell delimiters in the linearized column or row, the static position identifier being 1 greater than a highest position identifier assigned to the non-delimiting tokenized cells, allowing the exemplary system, method, and program product to output an encoded permutation-invariant representation of the linearized column or row. Therefore, the present embodiment has the capacity to improve processing of tabular data by providing an automated system for encoding linearized tabular data that outputs permutation-invariant representations of tabular data.

As previously described, many businesses store data including valuable information in tabular structures containing natural language text such as spreadsheets, CSV files, and relational databases. Various analytics and functions are used to process this text, such as search functions, question answering systems over table content, table interpretation functions to analyze structural and semantic understanding of the contents of a given table and more. Recent advances have popularized the use of transformer-based language models pre-trained on sentence-based natural language models to facilitate functions associated with table analytics. However, tabular data is order independent. For example, rows and columns may be shuffled without losing semantic meaning. A representation strategy for encoding tabular data that maintains the property of permutation invariance would be desirable for facilitating various functions associated with table analytics. Illustrative embodiments described herein, provide for an improved automated system that encodes linearized tabular data with permutation invariance (order independence). Data from columns and rows within a relational table may be encoded using illustrative embodiments described herein in an optimal manner such that the permutation-invariant output of encoded data may be used to build improved models for functions such as table search, table interpretation, table question-answering, and more. Illustrative embodiments herein are further shown through experimentation included herein to perform better than models that employ additional pre-training, thereby potentially eliminating or reducing the inherent time and costs associated with models requiring additional pretraining.

According to at least one embodiment of a computer system capable of employing methods in accordance with the present invention to encode permutation-invariant representations of linearized tabular data, the method, system, computer program product may receive input including tabular data and linearize a column or row within the received tabular data. The method, system, computer program product may then automatically assign an increasing sequence of position identifiers to each non-delimiting tokenized cell in the linearized column or row until a header delimiter is reached. Next, the method, system, computer program product may in response to reaching the header delimiter, automatically assign a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters. According to one embodiment, the method, system, computer program product may then automatically assign a static position identifier for each of the cell delimiters in the linearized column or row, the static position identifier being 1 greater than a highest position identifier assigned to the non-delimiting tokenized cells. The method, system, computer program product may then automatically output an encoded permutation-invariant representation of the linearized column or row. In turn, the method, system, computer program product has provided an improved automated system that encodes linearized tabular data, and outputs permutation-invariant representations of the tabular data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for encoding permutation-invariant representations of linearized tabular data.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a data processing program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a data processing program 110B and a database 116 and communicating with the client computing device 102 and IoT Device 118 via the communication network 114, in accordance with embodiments of the present disclosure. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the data processing program 110A,110B may be a program capable of receiving input including tabular data and linearizing a column or row within the received tabular data. Data processing program 110A,110B may then automatically assign an increasing sequence of position identifiers to each non-delimiting tokenized cell in the linearized column or row until a header delimiter is reached. Next, data processing program 110A, 110B may, in response to reaching the header delimiter, automatically assign a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters. Data processing program 110A,110B may then automatically assign a static position identifier for each of the cell delimiters in the linearized column or row, the static position identifier being 1 greater than a highest position identifier assigned to the non-delimiting tokenized cells. Finally, data processing program 110A,110B may automatically output an encoded permutation-invariant representation of the linearized column or row. In turn, data processing program 110A,110B has provided an improved automated system that encodes linearized tabular data, and outputs permutation-invariant representations of the tabular data that may facilitate the subsequent performance of various data analytic functions on the tabular data, as well as reduce costs associated with additional pretraining that may be needed in the absence of the permutation-invariant representations.

Referring now to FIG. 2, an operational flowchart depicting a process 200 for encoding permutation-invariant representations of linearized tabular data according to at least one embodiment is provided. At 202, data processing program 110A,110B receives input including tabular data and linearizes a column or row within the received tabular data. The received tabular data may be data from a column or row in a table that has been linearized into a pseudo-sentence, as shown at 220 in the example depicted in FIG. 2B. In this example, a column of data includes a header "City" and further includes a number of non-delimiting tokenized cells. In this example, the non-delimiting tokenized cells are related to entries in the column that list cities including Madrid, Seoul, Damascus, Singapore, and Kingstown. The pseudo-sentence is a left-to-right linearized representation of a column or row from a table within the received tabular dataset. The pseudo-sentence includes from, left-to-right, a 'CLS' token reserved to represent the start of a sequence, the column header, and non-delimiting tokenized cells, each non-delimiting tokenized cell separated by a cell delimiter, and finally, a 'SEP' token on the far right to indicate the end of an input. In this example, the non-delimiting tokenized cells are tokens corresponding to the list of cities that make up the entries of the column, and the cell delimiters are indicated by the symbol between each completed city name. In embodiments, exemplary pseudo-sentences may further include table metadata such as captions or titles of a given page where a table is present. If metadata is present, it may be added to the left side of the header of a given linearized pseudo-sentence.

In FIG. 2B, a table 215 includes a first row including a pseudo-sentence 220 shown with position identifiers assigned using a conventional encoding strategy in the second row at 230. At 240 in the third row of table 215, data processing program 110A,110B has assigned position identifiers to pseudo-sentence 220 using an encoding strategy in accordance with a presently describe embodiment. This example will be further explored below in connection with the stepwise description of how data processing program 110A,110B encodes linearized tabular data. One of ordinary skill in the art will appreciate that FIG. 2B is merely exemplary. In similar, but alternative embodiments, each cell value need not contain a single word, and can even contain a phrase or a sentence. The tokenization strategy depicted in FIG. 2B specifically pertains to a transformer class of models, however the encoding strategy described herein may be utilized with a variety of tokenization strategies.

At 204, the data processing program 110A,110B automatically assigns an increasing sequence of position identifiers to each non-delimiting tokenized cell in the linearized column or row until a header delimiter is reached. In some embodiments, this step may also include assigning increasing sequences of position identifiers to any metadata positioned to the left of the header. In the example shown in FIG. 2B, as shown at 240, data processing program 110A,110B assigns position identifiers from left to right to each non-delimiting tokenized cell until a header delimiter 260 is reached. As shown at 240, data processing program 110A, 110B performed this step by assigning the numbers 0, 1, and 2. In other words, data processing program 110A,110B assigned an increase sequence of position identifiers (starting from 0) until a header delimiter, in this case the colon symbol, was reached. In this example, "City" is the header, and the colon symbol is the header delimiter separating the non-delimiting tokenized cells from the header.

Next, at 206, in response to reaching the header delimiter, data processing program 110A,110B automatically assigns a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters. In the context of this disclosure, cell delimiters are all delimiters in a linearized column or row that are not the header delimiter. For example, as shown in FIG. 2B, the position identifier assigned to the header delimiter (the colon adjacent to the header "City") is 2. Accordingly, data processing program 110A,110B assigns monotonically increasing sequence of position identifiers for each non-delimiting tokenized cell positioned to the right of the header delimiter starting from 3, as 3 is 1 greater than the assigned position identifier of 2. Data processing program 110A,110B restarts from 3 each time it begins assigning position identifiers to non-delimiting tokenized cells positioned after any one of the cell delimiters in the linearized column. In this example, each of the cell delimiters are represented by the character "|", a symbol sometimes referred to as a vertical line, pipe, or vertical slash. Thus, data processing program 110A,110B assigns monotonically increasing sequences of position identifiers after each cell delimiter starting from the number 3 for each of the non-delimiting tokenized cells to the right of the header "City".

At 208, data processing program 110A,110B automatically assigns a static position identifier for each of the cell delimiters in the linearized column or row, the static position identifier being 1 greater than a highest position identifier assigned to the non-delimiting tokenized cells. In the example shown in FIG. 2B, data processing program 110A, 110B identifies that the highest position identifier assigned to the non-delimiting tokenized cells is 5, assigned to a cell associated with the city of Damascus. Accordingly, data processing program 110A,110B assigns a static position identifier of 6 to each of the cell delimiters 270, the cell delimiters being the vertical line symbols described above. Data processing program 110A,110B has now assigned position identifiers to the entirety of the linearized pseudo-sentence. In the example shown in FIG. 2B, there is a 'SEP' token on the far right to indicate the end of an input. Data processing program 110A,110B may assign a sequential position identifier 1 greater than the static position identifier assigned to the cell delimiters, as shown in FIG. 2B.

Finally at 210, data processing program 110A,110B outputs an encoded permutation-invariant representation of the linearized column or row. Once data processing program 110A,110B has encoded a linearized pseudo-sentence and assigned position identifiers to each cell, data processing program 110A,110B outputs an encoded permutation-invariant representation of the linearized column or row, similar to the representation shown at 240. In other words, the encoding strategy employed by data processing program 110A, 110B generates an output in which the order of the items within the dataset (the cities in the example above) does not matter. Mathematically speaking, the encoding strategy employed by data processing program 110A,110B models a mathematical function where $f(S)=f(\sigma(S))$ where $f(S) \in \mathbb{R}^d$ and $\sigma \in S_n$ where $S_n$ denotes a permutation group over $\mathbb{Z}_n^+$. In other words, even if the order of the items in the dataset are changed, data processing program 110A,110B will generate a similar output using the described encoding strategy.

The encoded permutation invariant representation output by data processing program 110A,110B, may then be input into a pretrained transformer model to generate a final vector for the processed column or row. In the context of this disclosure, the pretrained transformer models refer to the class of transformer models that use position identifiers. As discussed above, this encoding strategy functions to facilitate the subsequent performance of various data analytic functions on the tabular data, as well as reduces costs associated with additional pretraining that may be needed in the absence of the permutation-invariant representations. The generated final vector may be used as an input to help perform various table analytics functions, for example, table search functions, table interpretation functions, and table question-answering functions. The generated final vector may ultimately be used as an input for performing various table analytics functions either in a supervised setup, a zero-shot setting, or any other suitable or desired setting. In the context of this disclosure, a zero-shot setting is one in which there has been training performed on one set of labels, and testing performed on an entirely different set of labels. Suitable transformer encoder models that may be employed in a described embodiment may include, for example, Bert-Base, Bert-Large, RoBERTa-base, RoBERTa-large, Tiny-BERT, and any other suitable transformer encoder model. Embeddings generated using any suitable model that has been configured to employ the encoding strategies described herein will be invariant to the ordering of the cells being processed by data processing program 110A,110B. The benefits of using data processing program 110A,110B for encoding permutation-invariant representations of linearized tabular data will be discussed more below in connection with data described in FIG. 3.

Figure 2A:
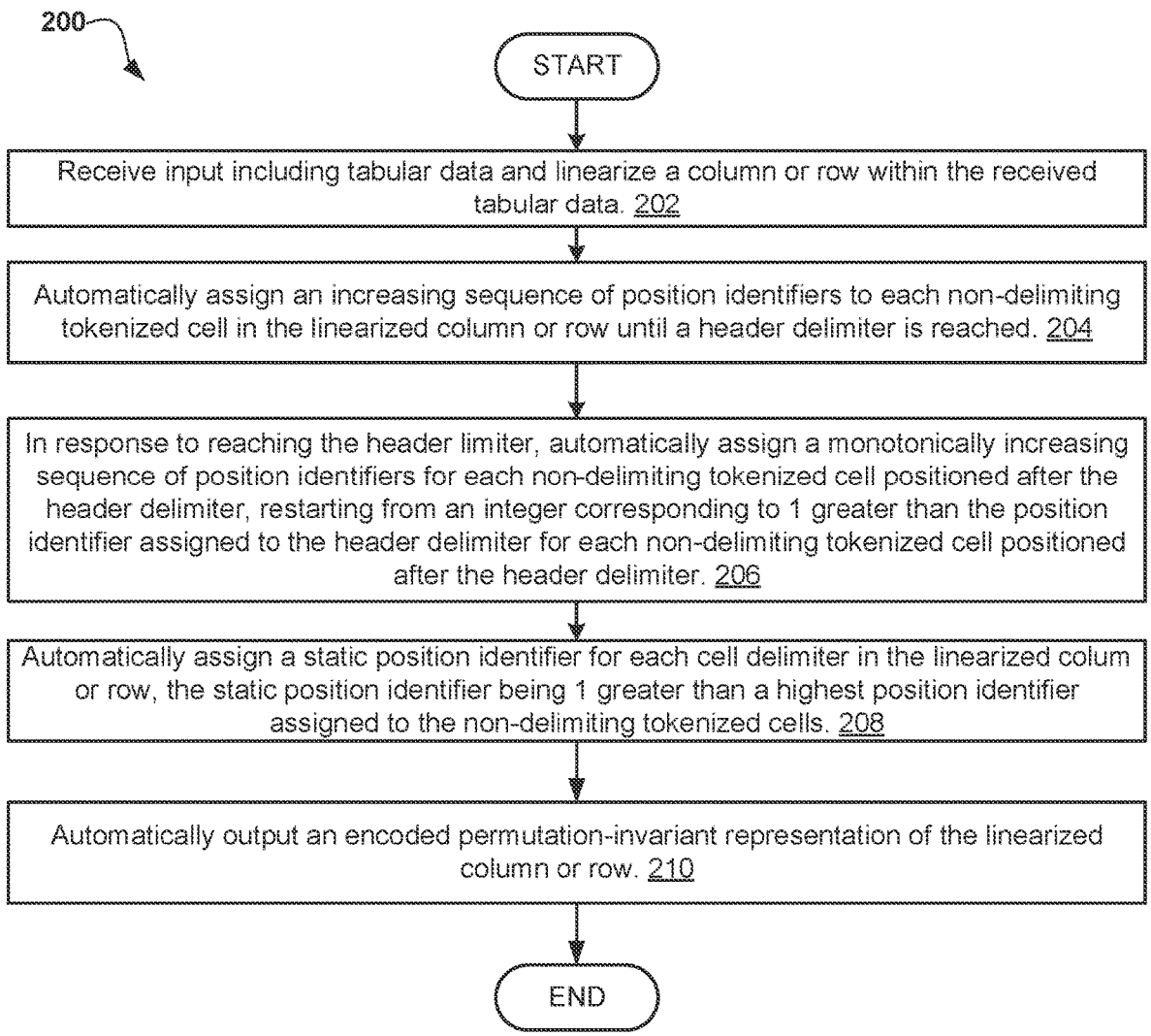
FIG. 2A illustrates an operational flowchart for encoding tabular data with permutation invariance according to at least one embodiment.

It may be appreciated that FIGS. 2A and 2B provide only illustrations of an exemplary implementation and do not imply any limitations with regard to how different embodiments may be implemented. Many modifications to the depicted environments may be made based on design and implementation requirements.

FIG. 3 depicts multiple tables illustrating column type annotation tasks performance data of an exemplary system that utilizes encoded tabular data with permutation invariance according to an exemplary described embodiment. Table 310 depicts Macro F results (testing both precision and recall) from an experiment run on the TURL (Table Understanding through Representative Learning) academic benchmark dataset (See Deng, Xiang, et al. "TURL: Table Understanding Through Representation Learning." VLDB (2020)). This dataset is built from tables in Wikipedia (called WikiTables) and the Freebase ontology. The column corresponding to 'All Input Data' settings used column header, canonical label of table cell mentions, and table metadata such as page title, section title, and table captions. The column for 'Entity Mentions Only' used table-cell mentions only. The column for 'Without Metadata' used canonical labels of the table-cell mentions only. The last row of the table depicts an approach using an exemplary approach in accordance with presently described embodiments, where PI represents permutation invariance. The Macro F results obtained for the approach that utilized permutation invariant representations of the tabular data are significantly better than the Macro F results obtained for an exemplary conventional approach, i.e., TURL model with pretraining using a TinyBERT model.

Table 320, also shown in FIG. 3, depicts results for which the evaluation metric is accuracy on a test set. A T2D dataset was used as described in Chen, Jiaoyan, et al. "Learning Semantic Annotations for Tabular Data." IJCAI, 2019. Training was done on 70 percent of the T2D dataset (called T2D-Tr) comprising 250 columns of 37 different types. Scoring was done on T2D-Te having 133 columns. As shown by Table 320, the accuracy results for the approach that incorporated a strategy that utilized permutation invariant representations of the tabular data performed significantly better than conventional approaches.

Table 330 depicts Zero-Shot results for column type annotations tasks where neither the columns nor the type labels within the valid/tests folds are seen within the training folds. A shuffled variant of the TURL academic benchmark set was used, and the train, valid, and test folds contained 190, 24, and 25 types split as per a zero shot strategy. Various ranking-based metrics were measured. The approaches that utilized permutation invariant representations obtained improved results as compared to conventional approaches.

Figure 4:
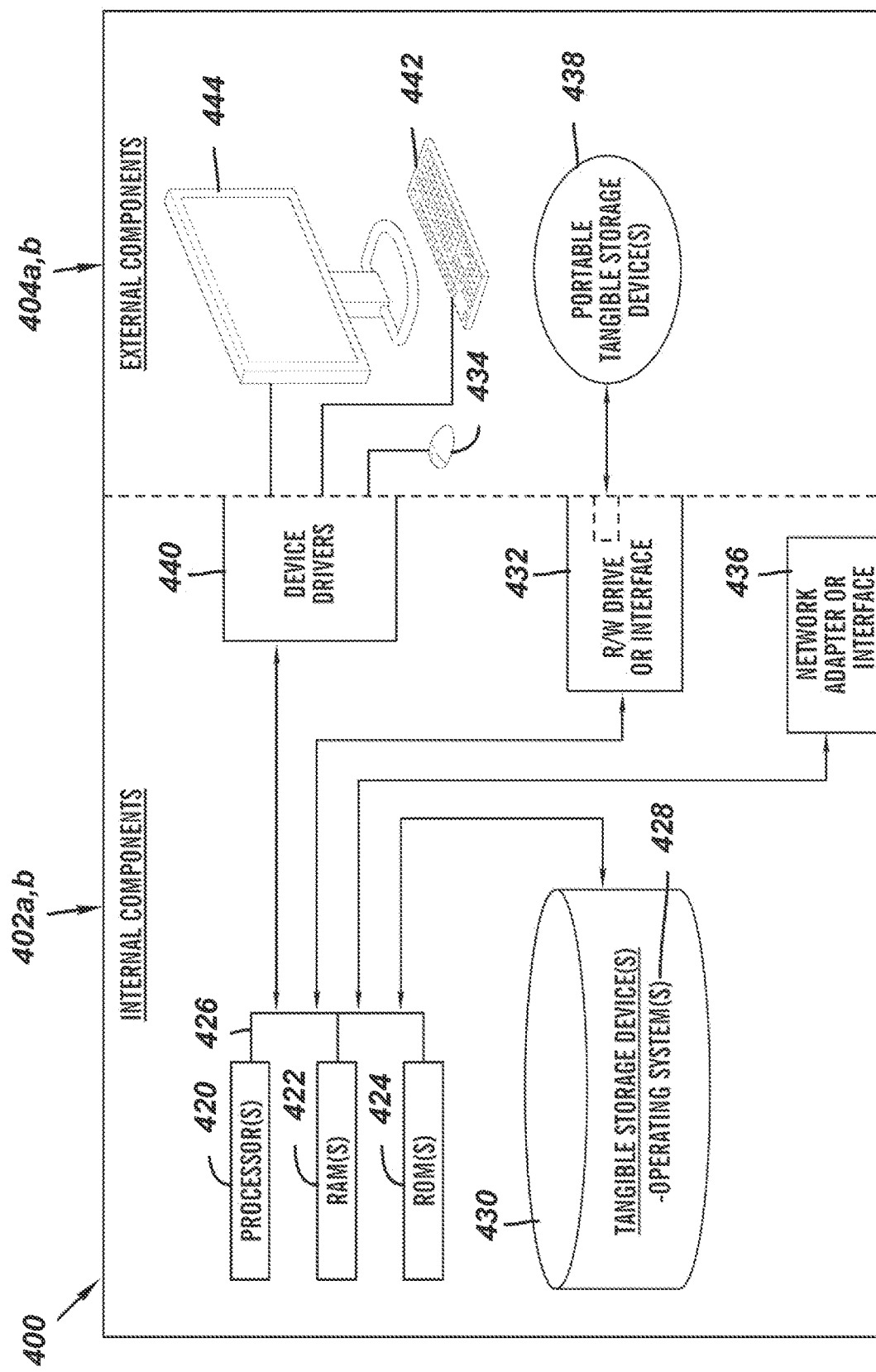
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the data processing program 110A in the client computing device 102 and the data processing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the data processing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the data processing program 110A in the client computing device 102 and the data processing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the data processing program 110A in the client computing device 102 and the data processing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
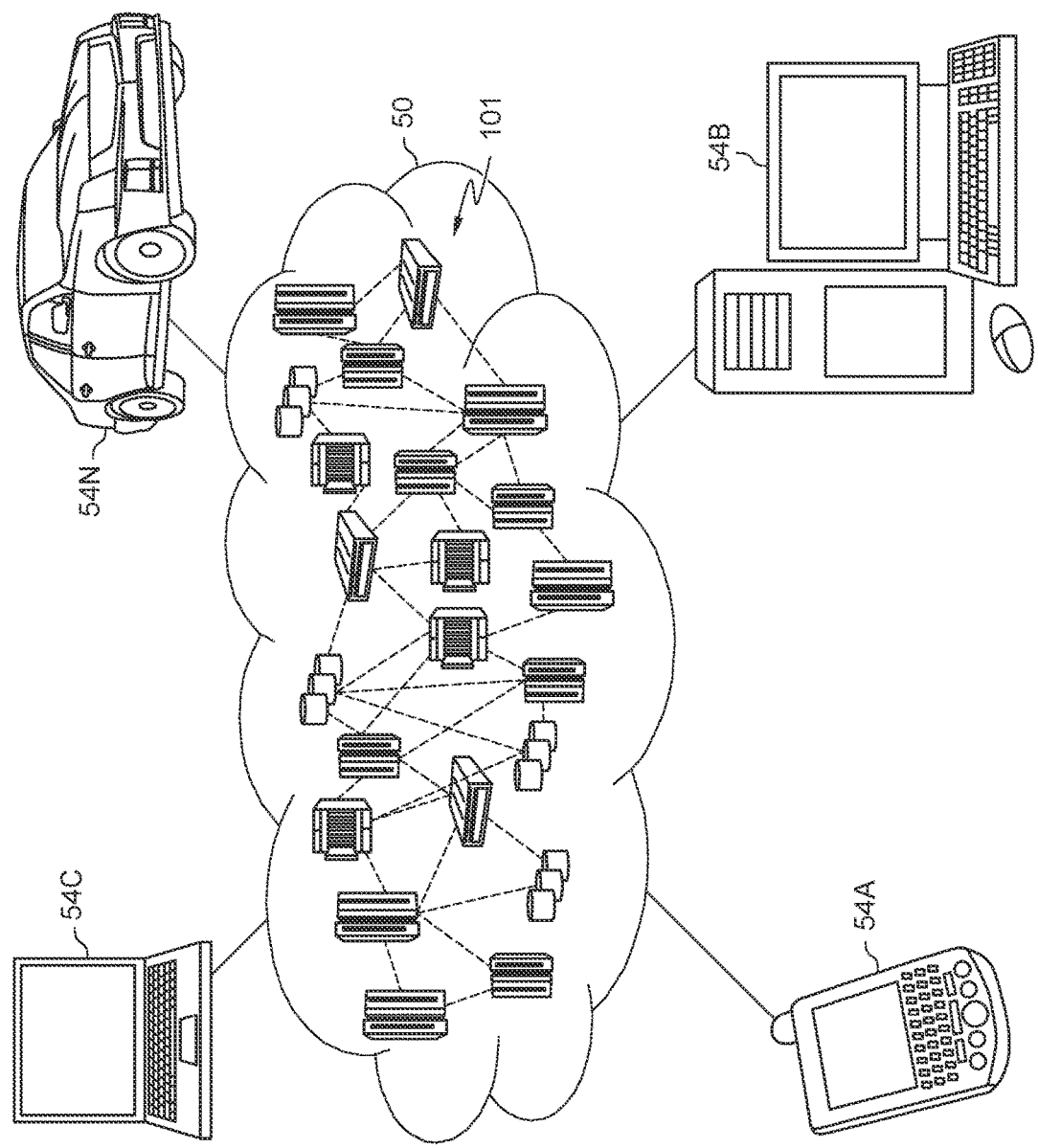
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
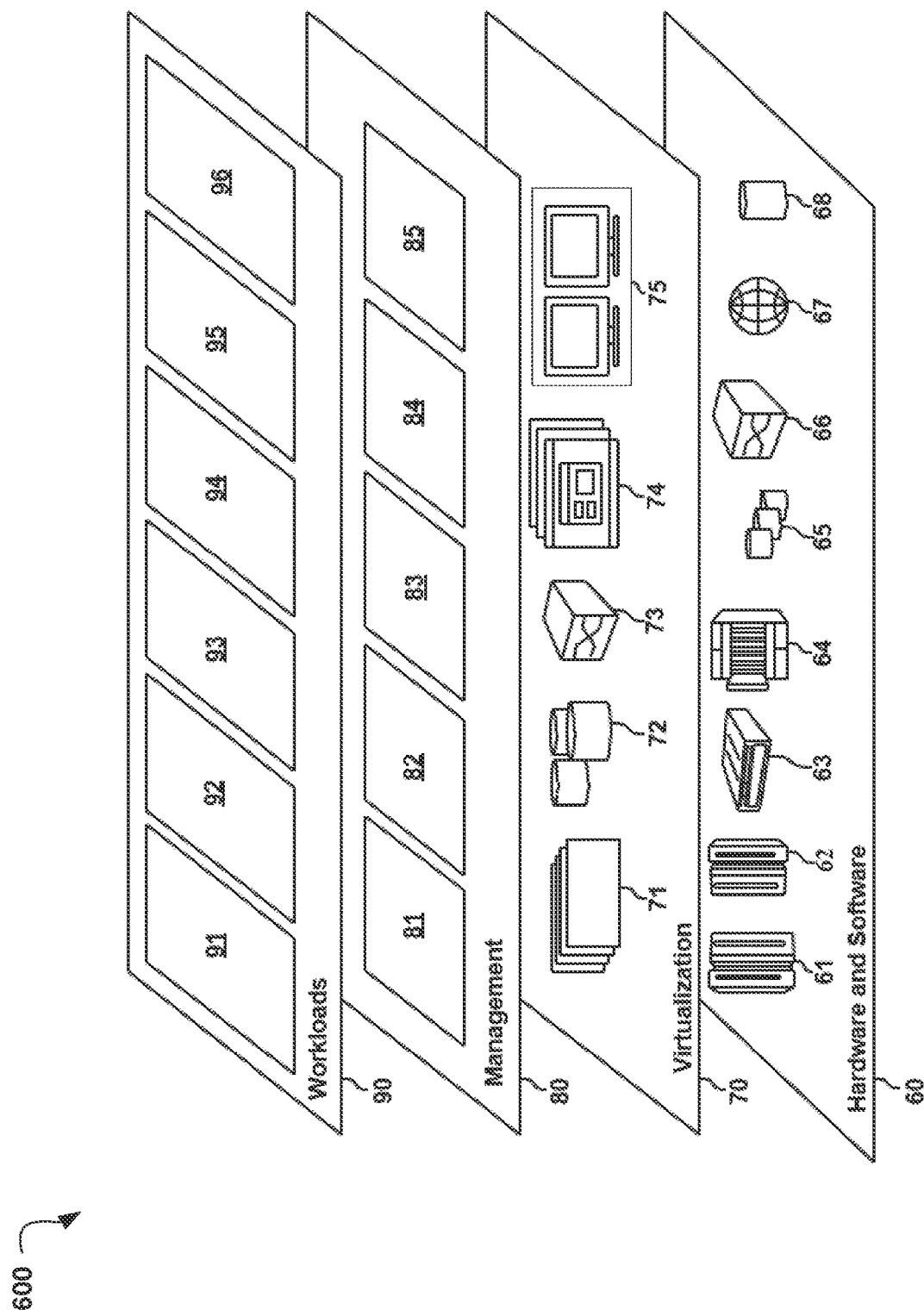
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; data processing 96. Data processing 96 may relate to encoding permutation-invariant representations of linearized tabular data.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of encoding tabular data with permutation invariance, the method comprising:
   receiving input including tabular data and linearizing a column or row within the received tabular data;
   automatically assigning an increasing sequence of position identifiers to each non-delimiting tokenized cell in the linearized column or row until a header delimiter is reached;
   in response to reaching the header delimiter, automatically assigning a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters;
   automatically assigning a static position identifier for each of the cell delimiters in the linearized column or row, the static position identifier being 1 greater than a highest position identifier assigned to the non-delimiting tokenized cells; and
   automatically outputting an encoded permutation-invariant representation of the linearized column or row.

2. The computer-based method of claim 1, further comprising inputting the encoded permutation invariant representation into a pretrained transformer model to generate a final vector.

3. The computer-based method of claim 2, further comprising using the generated final vector as an input for performing table search functions.

4. The computer-based method of claim 2, further comprising using the final vector as an input for performing for table question-answering functions.

5. The computer-based method of claim 2, further comprising using the final vector as an input for performing table interpretation functions.

6. The computer-based method of claim 2, further comprising using the final vector as an input in a down-stream table analytics function carried out in a supervised setup.

7. The computer-based method of claim 2, further comprising using the final vector as an input for performing a down-stream table analytics function carried out in a zero-shot setting.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving input including tabular data and linearizing a column or row within the received tabular data;
automatically assigning an increasing sequence of position identifiers to each non-delimiting tokenized cell in the linearized column or row until a header delimiter is reached;
in response to reaching the header delimiter, automatically assigning a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters;
automatically assigning a static position identifier for each of the cell delimiters in the linearized column or row, the static position identifier being 1 greater than a highest position identifier assigned to the non-delimiting tokenized cells; and
automatically outputting an encoded permutation-invariant representation of the linearized column or row.

9. The computer system of claim 8, further comprising inputting the encoded permutation invariant representation into a pretrained transformer model to generate a final vector.

10. The computer system of claim 9, further comprising using the generated final vector as an input for performing table search functions.

11. The computer system of claim 9, further comprising using the final vector as an input for performing for table question-answering functions.

12. The computer system of claim 9, further comprising using the final vector as an input for performing table interpretation functions.

13. The computer system of claim 9, further comprising using the final vector as an input in a down-stream table analytics function carried out in a supervised setup.

14. The computer system of claim 9, further comprising using the final vector as an input for performing a down-stream table analytics function carried out in a zero-shot setting.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving input including tabular data and linearizing a column or row within the received tabular data;
automatically assigning an increasing sequence of position identifiers to each non-delimiting tokenized cell in the linearized column or row until a header delimiter is reached;
in response to reaching the header delimiter, automatically assigning a monotonically increasing sequence of position identifiers for each non-delimiting tokenized cell positioned after the header delimiter, restarting from an integer corresponding to 1 greater than the position identifier assigned to the header delimiter for each non-delimiting tokenized cell positioned after cell delimiters;
automatically assigning a static position identifier for each of the cell delimiters in the linearized column or row, the static position identifier being 1 greater than a highest position identifier assigned to the non-delimiting tokenized cells; and
automatically outputting an encoded permutation-invariant representation of the linearized column or row.

16. The computer program product of claim 15, further comprising inputting the encoded permutation invariant representation into a pretrained transformer model to generate a final vector.

17. The computer program product of claim 16, further comprising using the generated final vector as an input for performing table search functions.

18. The computer program product of claim 16, further comprising using the final vector as an input for performing for table question-answering functions.

19. The computer program product of claim 16, further comprising using the final vector as an input for performing table interpretation functions.

20. The computer program product of claim 16, further comprising using the final vector as an input in a down-stream table analytics function carried out in a supervised setup.

* * * * *